Jan. 7, 1969    R. A. BUTTERY ET AL    3,420,274
TUBE END FITTING
Filed Sept. 6, 1966
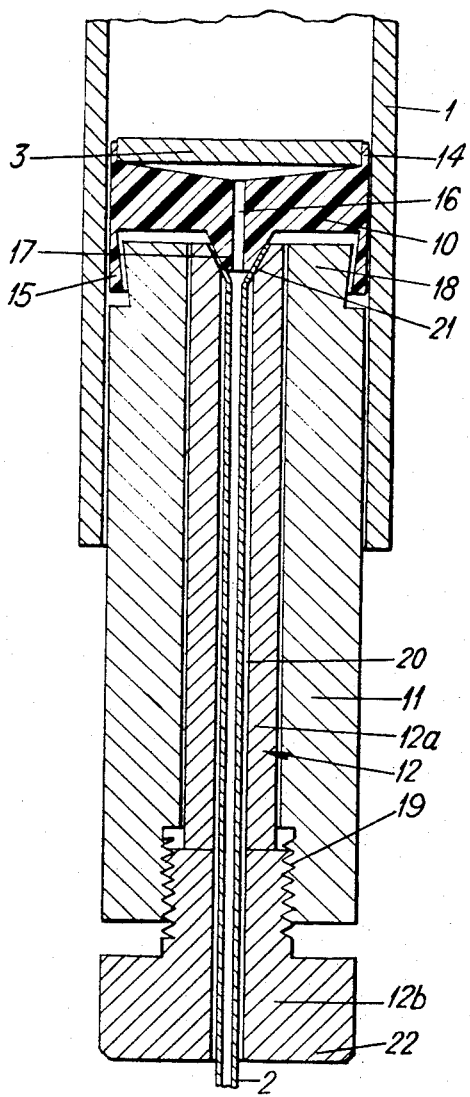
ROGER A. BUTTERY &
THOMAS TURNBULL
Inventors United States Patent Office 3,420,274
Patented Jan. 7, 1969

3,420,274
TUBE END FITTING
Roger A. Buttery, Ferring, and Thomas Turnbull, Carterton, England, assignors to Quickfit & Quartz Limited, Stone, Staffordshire, England, a corporation of Great Britain
Filed Sept. 6, 1966, Ser. No. 577,455
Claims priority, application Great Britain, July 22, 1966, 33,157/66
U.S. Cl. 138—90       6 Claims
Int. Cl. F16l *55/10;* B65d *39/12*

The present invention relates to a tube end fitting for use either as a tube end closure or as a connector unit for connecting together in sealed relationship a large diameter tube end and a small diameter tube end.

The tube end connector unit has particular application to the field of column chromatography, and provides a column end unit which can quickly be fitted into the end of a precision-bore tube to support a column packing support disc, and to direct the eluent flowing from the column and through the support disc into a small diameter tube. The invention further provides a unit which can be fitted at variable height within a tube so as to give different column lengths for different applications. The unit may be so designed that the eluent comes into contact only with glass and P.T.F.E. (polytetrafluoroethylene).

According to the present invention, a tube end fitting comprises a sealing element dimensioned to fit closely within a tube end and having an axial recess encircled by a deformable wall which increases in thickness towards its outer edge, a centrally bored expander sleeve having an outwardly flared extension adapted to fit within the said recess, a locking member extending within the sleeve, and interengaging means associated with the expander sleeve and the locking member which enable the locking member to be temporarily secured in the sleeve in an operative position in which the flared extension is partially withdrawn from the said recess whereby the deformable wall thereof is tightly pressed and sealed against the wall of the tube end.

The interengaging means referred to are preferably an internal screw thread in the sleeve and a mating external screw thread on the locking member.

The fitting may be designed as a closure for the tube end, in which case the sealing element is unapertured. The fitting may alternatively serve as a connector unit for connecting the tube end to a second tube end of smaller diameter. In the latter case the sealing element and the locking member are both centrally bored. The smaller diameter tube end may extend through the locking member and have its extremity held by the locking member in communication with the bore of the sealing element. As an alternative, the small diameter tube may connect on to the central bore of the locking member which would then itself communicate with the bore of the sealing element.

The sealing element is preferably formed wholly of P.T.F.E., and the axial recess thereof preferably has a reverse taper of the same angle as a corresponding reverse or flared taper on the extension of the expander sleeve. When the unit is designed for supporting chromatographic columns, the outer face of the sealing element may have a rim for locating a porous packing support disc.

In the case where the smaller diameter tube extends through the locking member it may terminate in a flared or flanged rim which is sealably held around the central bore of the sealing element by the locking member when this is in the operative position. In a preferred arrangement, the end of the smaller diameter tube is flared to locate sealably against a mating conical or raised seating surrounding the bore of the sealing element.

In order that the invention may more fully be understood, one preferred embodiment thereof will now be described, by way of example, with reference to the accompanying drawing which shows a longitudinal cross-section of an end connector unit providing an end support for a chromatographic column.

The drawing shows a tube end connector unit for fitting within the end of a precision bore large diameter tube 1 and for connecting this tube in sealed relationship to a small diameter tube 2. The unit is adapted to hold a column packing support disc 3, and with this disc constitutes a column end unit for a chromatographic column.

The end connector unit comprises essentially a sealing element 10, an expander sleeve 11 and a locking member 12.

The sealing element 10 is formed of P.T.F.E., and is dimensioned so as to fit closely within the walls of the tube 1 but with a slight clearance in the undeformed condition. The outer face has a rim 14 adapted to locate in place and to seal around the support disc 3. The inner end is provided with an axial recess encircled by a wall 15 which increases in thickness towards its outer or free edge, giving a recess a reverse taper. The walls 15, being made of P.T.F.E., are slightly deformable. The sealing element has a central bore 16, and the inner end of this is surrounded by a conical seating 17.

The expander sleeve 11 has an outwardly flared extension 18, which locates within the recess of the sealing member. The reverse taper of the extension 18 matches that of the walls 15. The sleeve has a central bore, the lower portion of which is provided with a screw thread 19.

The locking member 12 is, for ease of manufacture, made in two parts, namely a liner 12a and a screw 12b, both centrally bored to define a line 20 for accommodating the tube 2. The liner 12a terminates in a conical recess 21 at its upper end, and the screw 12b has screw threads engageable with the threads 19 of the sleeve, and a finger-grip 22.

In use, the extension 18 of the sleeve is fitted into the recess of the sealing element 10, by inserting it at an angle while slightly deforming the walls 15. The tube 2 is then inserted through the locking member 12, and the end is formed into a conical mouth as shown by means of a heated tool with a taper corresponding to that of the seating 17. Both parts of the locking member are then fitted into the sleeve and loosely screwed into it.

The assembled unit is then fitted into the tube 1 and the screw 12b is tightened, so that the end 21 of the liner presses the flared end of tube 2 against the seating 17. This action at the same time tends to push the sealing element away from the sleeve, and, by virtue of the reverse tapers of the walls 15 and the extension 18, the walls 15 are tightly pressed and sealed against the walls of the tube 1. In the operative position with the locking member tightly screwed into place, water-tight and gas-tight seals are formed between walls 15 of the sealing element 10 and the walls of tube 1 and between the seating 17 and the end of tube 2, which is thereby connected in sealed relationship to the central bore of the sealing element.

In an alternative column end connector, not shown, the smaller diameter tube is connected as by a nipple to the locking member so as to communicate with the bore thereof, and the upper end of the liner seals directly onto the seating 17, so that the locking member provides an intermediate connection between the large diameter and small diameter tubes.

A fitting for forming a closure at the end of a tube, such as the tube 1, may be of similar design to the column end unit as described, except in that no bores or apertures are provided in the sealing element and locking member.

We claim:

1. A tube end fitting comprising a sealing element having a main body portion and a deformable wall defining a recess in said element, said deformable wall being dimensioned to fit closely but slidably within a cylindrical tube in the undeformed state and being of increasing thickness towards its free edge, an axially bored expander sleeve having an outwardly flared extension adapted to fit within said recess, a locking member in the bore of said sleeve and extending into said recess of said sealing element, and interengaging means coupling said expander sleeve with said locking member to enable the locking member to be temporarily secured in the sleeve in an operative position, said interengaging means causing separating axial movement between said sealing element and said expander sleeve whereby said deformable wall slides axially relative to said flared extension and is expanded radially, thereby pressing said deformable wall of said sealing element in sealing relationship with the wall of the cylindrical tube.

2. A tube end fitting according to claim 1, for connecting together in sealed relationship the bore of the said cylindrical tube and the bore of a smaller diameter tube, in which the said sealing element is axially bored, and in which the said locking element is axially bored so as to receive the smaller diameter tube and, in the said operative position, is adapted to hold the smaller diameter tube in communication with the bore of the sealing element.

3. A tube end fitting according to claim 2, in which the sealing element has within its recess a raised seating surrounding the axial bore thereof, and in which the locking member has its axial bore terminating in a countersunk recess of shape corresponding to the said raised seating, whereby an outwardly flared rim of the smaller diameter tube may be sealably located between the said raised seating and countersunk recess.

4. A tube end fitting as claimed in claim 1, in which the main body portion and the deformable wall of the sealing element are integrally formed of resilient material.

5. A tube end fitting as claimed in claim 1 for connecting together in sealed relationship the bore of the said cylindrical tube and the bore of a smaller diameter tube, in which the said sealing element is axially bored, and in which the said locking element is also axially bored and is adapted when in the said operative position to provide communication between the axial bore of the sealing element and the smaller diameter tube which is attachable to the outer end of the locking member.

6. An end unit for a chromatographic unit comprising a tube end fitting as claimed in claim 2 in combination with a column packing support disc.

References Cited

UNITED STATES PATENTS

| | | | |
|---|---|---|---|
| 686,387 | 11/1901 | Cogswell | 220—24.5 |
| 1,226,209 | 5/1917 | Harris | 220—24.5 X |
| 1,644,118 | 10/1927 | Florence | 138—90 |
| 2,856,963 | 10/1958 | Hoerter | 138—89 |

HERBERT F. ROSS, *Primary Examiner.*

U.S. Cl. X.R.

138—89; 220—24.5